F. WESTPHAL.
Velocipede.
No. 92,132. Patented June 29, 1869.
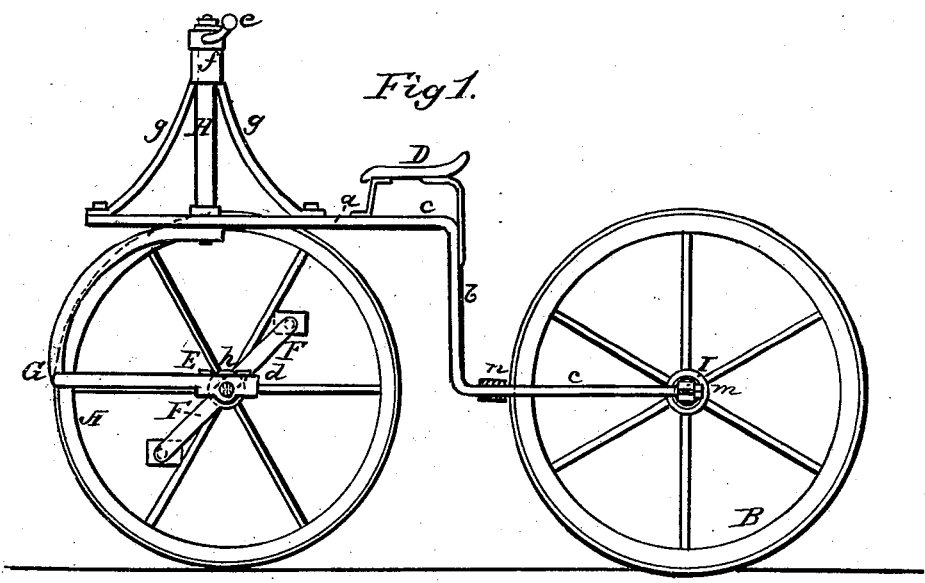
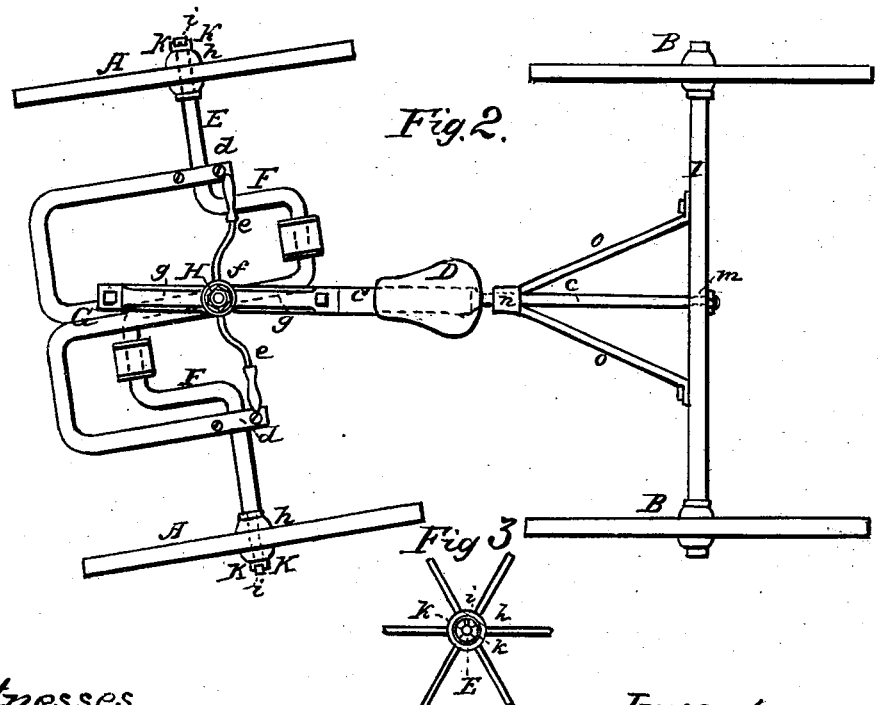
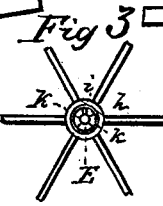

United States Patent Office.

FREDERICK WESTPHAL, OF JERSEY CITY, NEW JERSEY, ASSIGNOR TO HIMSELF, JOHN V. R. SPENCER, AND ALEXANDER BEAKES, OF SAME PLACE.

Letters Patent No. 92,132, dated June 29, 1869.

IMPROVED VELOCIPEDE.

The Schedule referred to in these Letters Patent and making part of the same.

*To all whom it may concern:*

Be it known that I, FREDERICK WESTPHAL, of Jersey City, in the county of Hudson, and State of New Jersey, have invented a new and useful Improvement in Velocipedes, of which the following is a full, clear, and exact description, reference being had to the accompanying drawing, forming part of this specification, and in which—

Figure 1 represents a partly sectional side elevation of a velocipede, having my invention applied to it;

Figure 2, a plan of the same; and

Figure 3, an end view of the front-axle, and box or hub-portion of one of the front wheels.

Similar letters of reference indicate corresponding parts.

My improvement more particularly relates to four-wheeled velocipedes; and consists in a novel construction of steering-yoke, arranged to receive the operating-cranks within and beneath it, in combination with the vertical steering-spindle attached to said yoke, a braced upper socket or bearing to said spindle, and arrangement of the same relatively to the pole, which also forms a bearing to the steering-spindle.

Referring to the accompanying drawing—

A A are the front, and B B the rear wheels of a four-wheeled velocipede, and C the pole, which is bent, as shown, at *a*, *b*, and *c*, and carries the operator's seat, D.

The front axle E is shown as being driven or operated by cranks, F F, through suitable foot-pieces on their wrist-pins, but hand-levers for operating the driving-cranks may, if preferred, be substituted or employed in addition.

The bearings *d d* to this axle are formed in the steering-yoke G, whereby a separate frame for such provision is dispensed with.

To effect this, and to allow of the play of the cranks within, and beneath it, said steering-yoke is spread and bent, as clearly indicated in figs. 1 and 2, and connected at its upward portion with a vertical steering-spindle, H, fitted with handles, *e e*, and having a bearing within and through the pole; also a second bearing, *f*, above, connected by braces, *g g*, with the pole, to give firmness.

The front wheels A A may be said to be neither fast nor loose in the axle E, inasmuch as their hubs or boxes, *h h*, are hung loose on the axle, but are driven, together with their wheels, by said axle, through drivers or pins, *i i*, which pass through either end of the latter, striking and bearing against stops or projections, *k k*, on the ends of the hubs or boxes of the wheels. By this mode of hanging or gearing the wheels A A, with their axles E, increased facility is afforded for changing the direction of the vehicle; as, for instance, in running round corners or curves, inasmuch as the wheel which lies on the inside of the curve is free to turn a given distance independently of the axle, thereby avoiding scraping of said wheel on the ground.

The connecting-pole C is rounded at its rear portion, *c*, to permit of its turning in a horizontal bearing, *m*, made in the rear axle I, and in another horizontal bearing, *n*, connected with the axle by braces *o o*. Said rear axle has no rotation on its own axis, but the wheels B B are hung to turn loosely or freely upon it.

By this connection of the pole C with the rear axle, said pole is free to revolve in the rear axle, that is, in a transverse relationship to it, which allows of the back wheels tipping to either side, without straining the vehicle or tipping or throwing the front wheels into a similar position.

The vehicle may be furnished with a cover or top, resting on springs.

What is here claimed, and desired to be secured by Letters Patent, is—

The steering-yoke G, constructed to allow of the rotation of the operating-cranks within and beneath it, and forming bearings, *d d*, to the axle E, outside of said cranks, in combination with the vertical steering-spindle H, having a bearing in the pole C, and upper bearing, *f*, connected with the pole by braces, *g g*, essentially as shown and described.

FR. WESTPHAL.

Witnesses:
 J. W. COOMBS,
 ARTHUR KINNIER.